(12) United States Patent
Park et al.

(10) Patent No.: US 7,773,168 B2
(45) Date of Patent: Aug. 10, 2010

(54) LIQUID CRYSTAL DISPLAY WHEREIN THE DATA LINE OVERLAPS THE SOURCE REGION IN A DIRECTION PARALLEL WITH THE GATE LINE AND ALSO OVERLAPS THE DRAIN REGION

(75) Inventors: Tae-Hyeong Park, Yongin-si (KR); Joon-Ha Park, Busan (KR); So-Hyun Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 91 days.

(21) Appl. No.: 11/980,857

(22) Filed: Oct. 30, 2007

(65) Prior Publication Data

US 2008/0123010 A1     May 29, 2008

(30) Foreign Application Priority Data

Nov. 24, 2006    (KR)   .................... 10-2006-0116853

(51) Int. Cl.
    *G02F 1/136*     (2006.01)
    *G02F 1/1335*     (2006.01)
    *G02F 1/1343*     (2006.01)

(52) U.S. Cl. .......................... 349/43; 349/139; 349/109

(58) Field of Classification Search ................ 349/144, 349/145, 146, 109, 48, 47, 139, 42, 43
See application file for complete search history.

(56) References Cited

U.S. PATENT DOCUMENTS 6,847,421 B2    1/2005    Cheng
6,995,827 B2    2/2006    Chien et al.
2001/0052950 A1*   12/2001   Yamazaki et al. ............. 349/43
2002/0024622 A1*   2/2002   Murade ....................... 349/44

(Continued)

FOREIGN PATENT DOCUMENTS

CN      1319781 A     10/2001

(Continued)

OTHER PUBLICATIONS

Patent Abstracts of Japan, Publication No. 08-069000, Mar. 12, 1996, 1 p.

(Continued)

*Primary Examiner*—Andrew Schechter
*Assistant Examiner*—Dennis Y Kim
(74) *Attorney, Agent, or Firm*—Innovation Counsel LLP

(57) ABSTRACT

A liquid crystal display includes an insulating substrate, a semiconductor, a gate insulating layer, a gate line, an interlayer insulating layer, a data line, a drain electrode, a passivation layer, and a pixel electrode. The semiconductor is formed on the insulating substrate and includes source, drain, and channel regions. The gate line is formed on the gate insulating layer over the semiconductor, and overlaps the channel region thereof. The data line is formed on the interlayer insulating layer and has a source electrode electrically connected to the source region and a drain electrode electrically connected to the drain region. The passivation layer is formed on the data line and drain electrode. The pixel electrode is formed on the passivation layer, and electrically connected to the drain electrode. The data line overlaps the drain region.

16 Claims, 6 Drawing Sheets

U.S. PATENT DOCUMENTS

2005/0068281 A1* 3/2005 Shin et al. .................. 345/88
2005/0142680 A1* 6/2005 Ha et al. .................... 438/30

FOREIGN PATENT DOCUMENTS

| CN | 1506738 A | 6/2004 |
| CN | 1836188 A | 9/2006 |
| JP | 8-69000 | 3/1996 |
| JP | 2000-221524 | 8/2000 |
| JP | 2001-194671 | 7/2001 |
| JP | 2005-62387 | 3/2005 |
| JP | 2005-62629 | 3/2005 |
| JP | 2005-215343 | 8/2005 |
| KR | 2001-0003439 | 1/2001 |
| KR | 2001-0003750 | 1/2001 |
| KR | 10-2006-0014321 | 2/2006 |
| KR | 10-2006-0082316 | 7/2006 |

OTHER PUBLICATIONS

Patent Abstracts of Japan, Publication No. 2000-221524, Aug. 11, 2000, 1 p.
Patent Abstracts of Japan, Publication No. 2001-194671, Jul. 19, 2001, 2 pp.
Patent Abstracts of Japan, Publication No. 2005-062387, Mar. 10, 2005, 1 p.
Patent Abstracts of Japan, Publication No. 2005-062629, Mar. 10, 2005, 1 p.
Patent Abstracts of Japan, Publication No. 2005-215343, Aug. 11, 2005, 1 p.
Korean Patent Abstracts, Publication No. 2001-0003439, Jan. 15, 2001, 2 pp.
Korean Patent Abstracts, Publication No. 2001-0003750, Jan. 15, 2001, 1 p.
Korean Patent Abstracts, Publication No. 10-2006-0014321, Feb. 15, 2006, 2 pp.
Korean Patent Abstracts, Publication No. 1020060082316, Jul. 18, 2006, 1 p.

* cited by examiner

LIQUID CRYSTAL DISPLAY WHEREIN THE DATA LINE OVERLAPS THE SOURCE REGION IN A DIRECTION PARALLEL WITH THE GATE LINE AND ALSO OVERLAPS THE DRAIN REGION

RELATED APPLICATIONS

This application claims priority of Korean Patent Application No. 10-2006-0116853, filed Nov. 24, 2006, the entire disclosure of which is incorporated herein by reference.

BACKGROUND

This disclosure relates to display panels in general, and more particularly, to display panels for liquid crystal displays (LCDs) having improved aperture ratios.

LCDs constitute one of the more widely used types of flat panel displays (FPDs), and typically include two display panels on which field generating electrodes, such as pixel electrodes and a common electrode, are respectively formed, with a layer of a liquid crystal material interposed between the two panels. A voltage is applied to the field generating electrodes to generate an electric field in the liquid crystal layer, which determines the orientation of the molecules of the liquid crystal layer therebetween and thereby controls the polarization of light passing through the panels so as to display an image.

Among the various types of LCDs available, one advantageous type, referred to as a vertical alignment (VA) mode LCD because the longitudinal axes of the liquid crystal molecules are arranged perpendicularly to the upper and lower display panels when no electric field is applied to the electrodes, has received increased attention lately, because the contrast ratio of such displays is relatively large, and because they enable LCDS with relatively large reference viewing angles to be produced easily.

VA mode LCDs share a major drawback with other types of LCDs, namely, a relatively narrow viewing angle. Various methods have been introduced in an effort to overcome this drawback. For example, one method includes arranging the liquid crystal molecules vertically with respect to the upper and lower substrates and then forming cutout patterns in the pixel electrodes and the electrode facing the pixel electrode. In another method, the pixel electrodes are divided into a plurality of sub-electrodes.

However, if a cutout pattern is formed in the electrodes of a pixel, the aperture ratio of the pixel is reduced proportionately to the area of the cutout pattern. Furthermore, if sub-electrodes are formed in a pixel, the aperture ratio of the pixel is also reduced, due to the presence of a connecting member needed for electrically connecting the sub-electrodes to each other.

BRIEF SUMMARY

In accordance with the exemplary embodiments disclosed herein, LCDs with higher brightness are provided in which the improvement in brightness is achieved by minimizing the amount of reduction in the aperture ratio of the LCDs that otherwise result from the above measures taken to increase their viewing angles.

In one exemplary embodiment, an LCD includes a first insulating substrate, a semiconductor, a gate insulating layer, a gate line, an interlayer insulating layer, a data line, a drain electrode, a passivation layer, and a pixel electrode.

The semiconductor is formed on the insulating substrate, and includes a source region, a drain region, and a channel region. The gate insulating layer is formed on the semiconductor. The gate line is formed on the gate insulating layer and overlaps the channel region. The interlayer insulating layer is formed on the gate line. The data line is formed on the interlayer insulating layer and has a source electrode electrically connected to the source region. The drain electrode is electrically connected to the drain region. The passivation layer is formed on the data line and drain electrode. The pixel electrode is formed on the passivation layer and is electrically connected to the drain electrode. The data line overlaps the drain region.

The source electrode may overlap the source region. The gate line may include a gate electrode protruding from the gate line, and the channel region may include a first channel region overlapping the gate line and a second channel region overlapping the gate electrode. The semiconductor may incorporate one or more bends and be made of polysilicon.

The pixel electrode may comprise a plurality of sub-electrodes, each having a quadrangular shape with rounded corners, may be aligned in a matrix along with a plurality of other pixel electrodes, and may cross the pixel electrode of an adjacent pixel row so that three adjacent pixel electrodes form a triple pixel region, and the semiconductor may be formed so as to extend through two adjacent triple pixel regions. Each triple pixel region may be comprise two corners of two laterally adjacent pixel electrodes and one edge of a vertically adjacent pixel electrode.

The liquid crystal display may further include a second substrate disposed in facing opposition to the first insulating substrate, a light blocking member formed on the second substrate, a color filter formed in a region defined by the light blocking member, and a common electrode having a plurality of cutouts formed on the color filter.

The light blocking member may have light blocking regions corresponding to respective ones of the triple pixel regions, and each cutout of the common electrode may correspond to the center of a corresponding one of the sub-electrodes. Color filters corresponding to respective ones of the three pixel electrodes of each triple pixel region may respectively display red, green, or blue.

In accordance with the exemplary embodiments described herein, the reduction in display aperture ratio that results from the implementation of viewing-angle-improving features in the display is minimized, thereby improving the aperture ratio of the display. A better understanding of the above and many other features and advantages of the novel higher-brightness LCDs of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
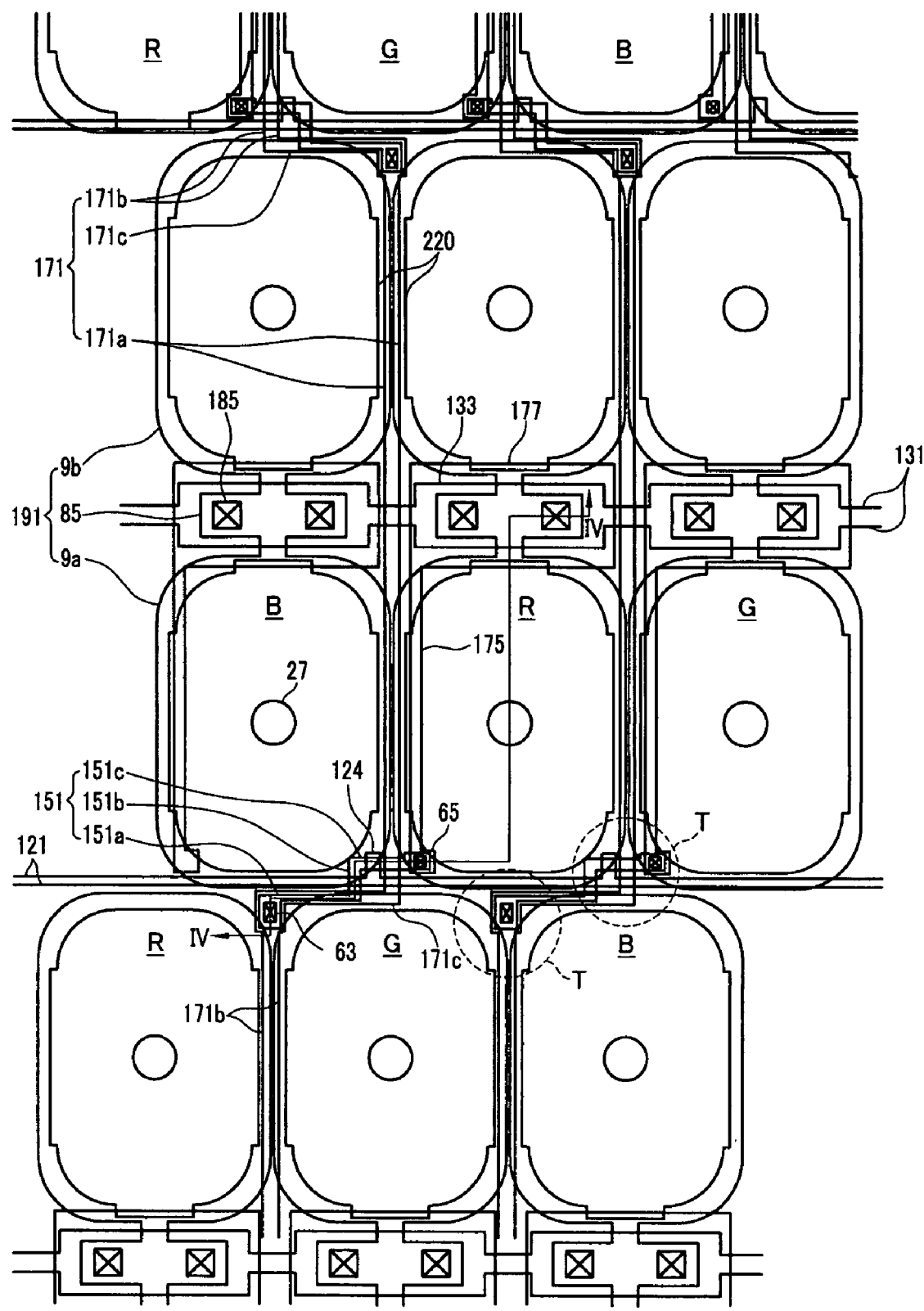
FIG. 1 is a partial plan view of an exemplary embodiment of an LCD in accordance with the present invention, showing a group of exemplary pixels thereof.

The present invention is described more fully hereinafter with reference to the accompanying drawings, in which exemplary embodiments thereof are shown. As those skilled in the art will appreciate, the described embodiments can be modified in various ways, all without departing from the spirit or scope of the present invention.

In the drawings, the thickness of layers, films, panels, regions, and the like may be exaggerated for clarity. Like reference numerals are used to designate like elements throughout the specification. Also, it should be understood that when an element, such as a layer, film, region, or substrate, or the like, is described as being "on" another element, it is meant that the first element may be disposed directly on the other element, or alternatively, that intervening elements may also be present. Conversely, when an element is described as being disposed "directly on" another element, it is meant that no intervening elements are present.

Figure 2:
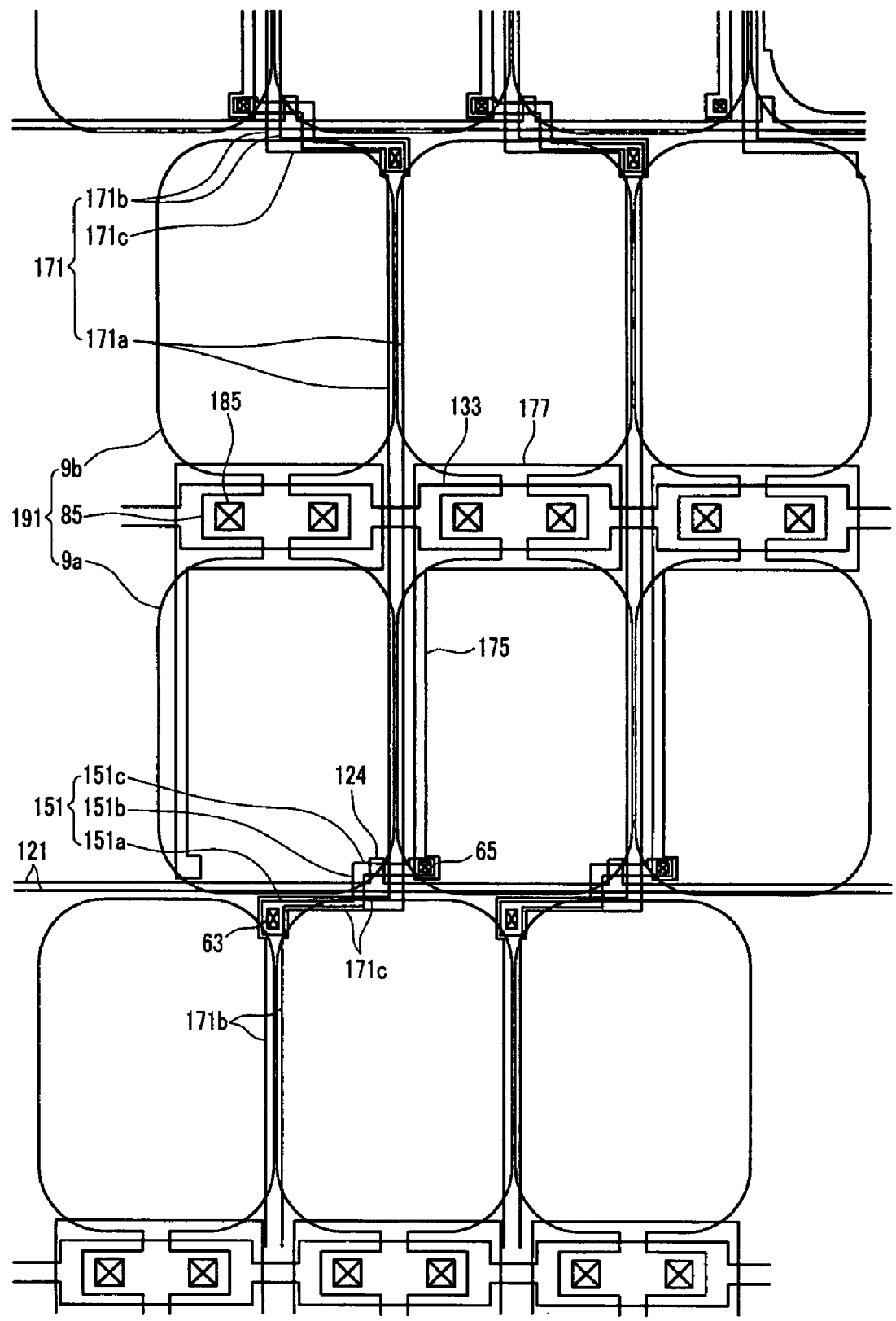
FIG. 2 is a partial plan view of an exemplary embodiment of a thin film transistor (TFT) array panel of the LCD of FIG. 1.
Figure 3:
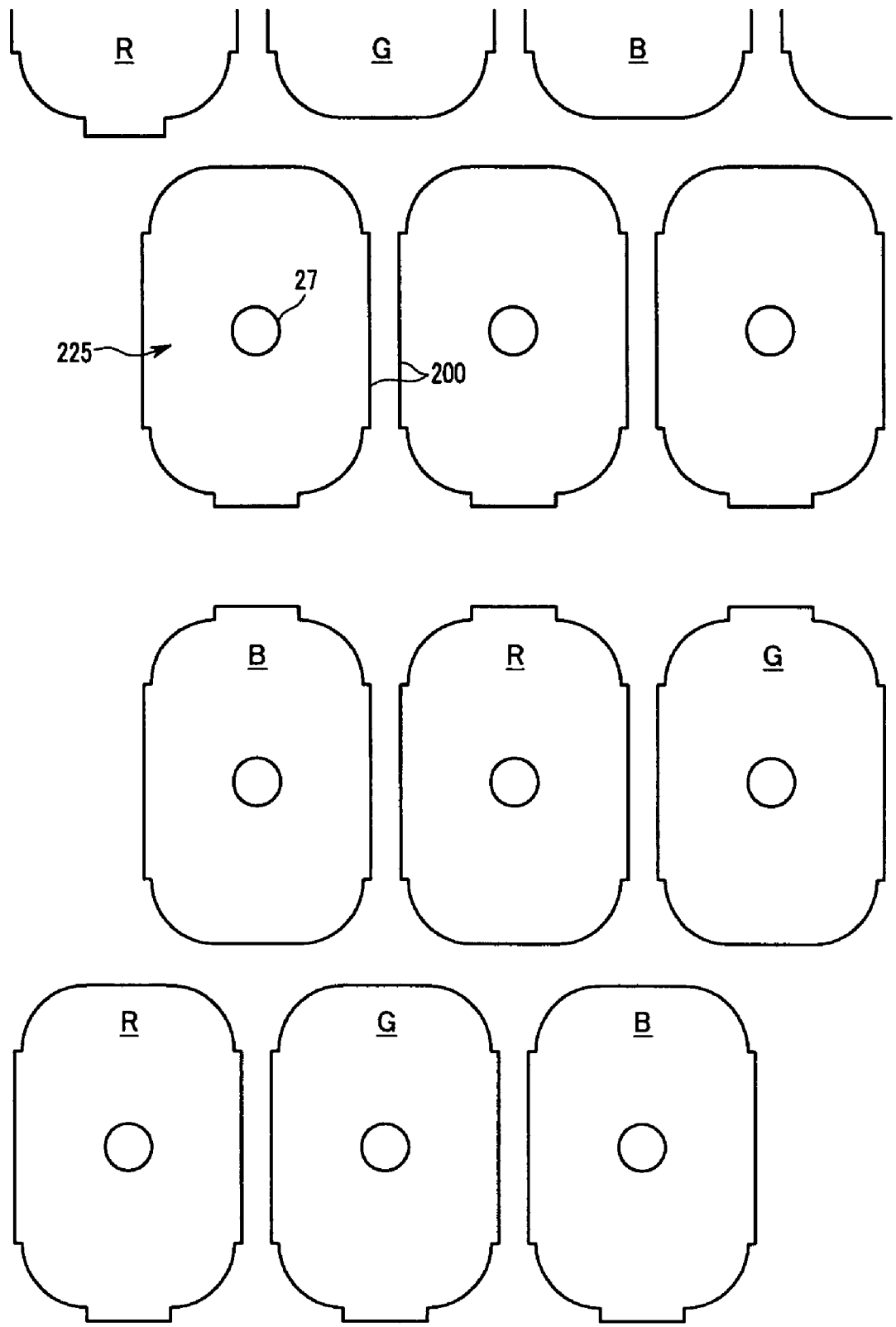
FIG. 3 is a partial plan view of an exemplary embodiment of a common electrode panel of the LCD of FIG. 1.
Figure 4:
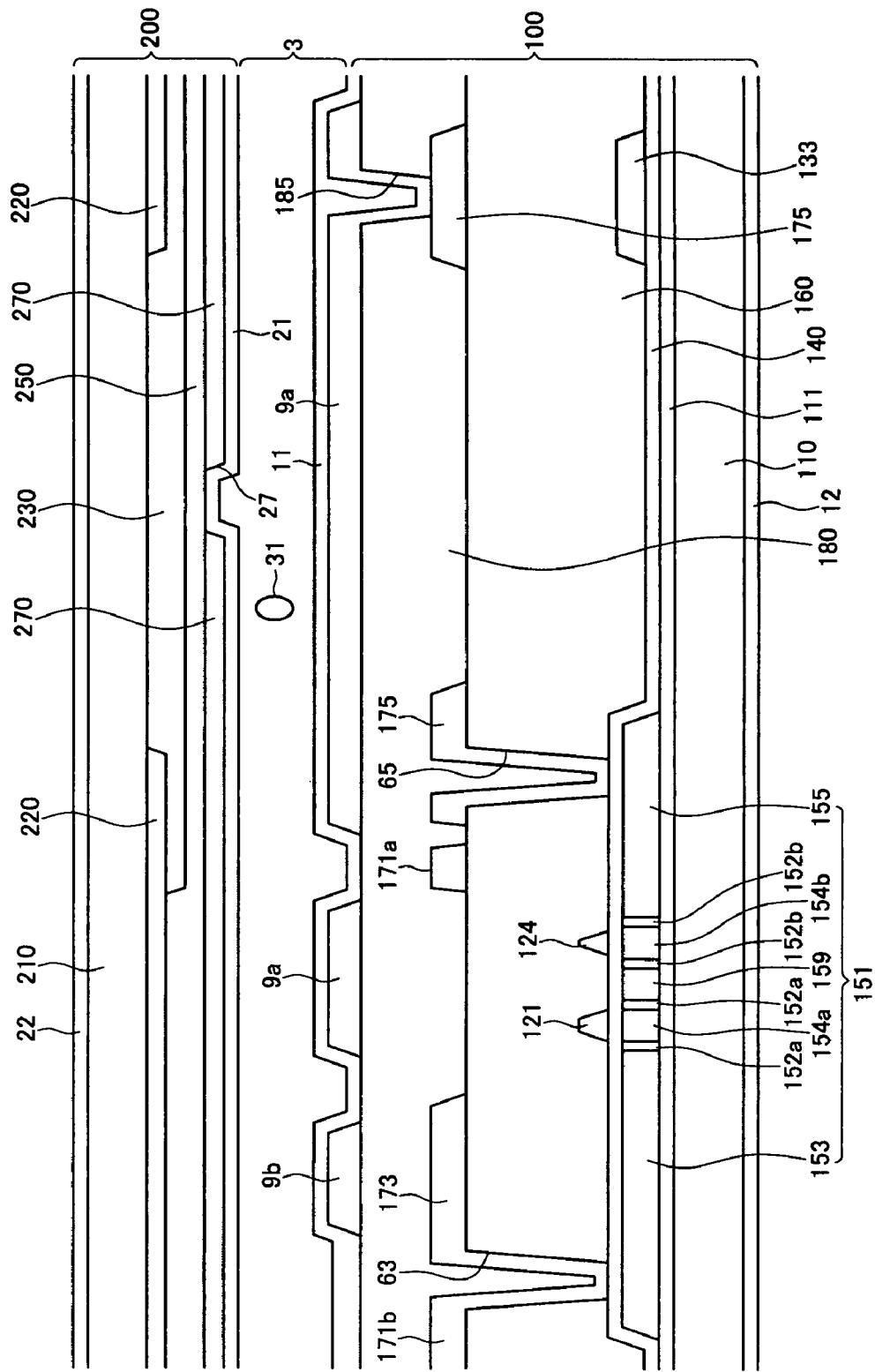
FIG. 4 is a partial cross-sectional view of the LCD of FIG. 1, as seen along the lines of the section IV-IV taken therein.

An exemplary embodiment of an LCD in accordance with the present invention is described below with reference to FIGS. 1-4, wherein FIG. 1 is a partial plan view of the exemplary LCD, showing a group of exemplary pixels thereof, FIG. 2 is a partial plan view of an exemplary embodiment of a thin film transistor (TFT) array panel of the LCD of FIG. 1, FIG. 3 is a partial plan view of an exemplary embodiment of a common electrode panel of the LCD of FIG. 1, and FIG. 4 is a partial cross-sectional view of the LCD of FIG. 1, as seen along the lines of the section IV-IV taken therein.

Referring first to FIG. 4, the exemplary LCD includes a TFT array panel 100, a common electrode panel 200 disposed in facing opposition to the TFT array panel 100, and a layer of a liquid crystal material 3 interposed between the thin film transistor display panel 100 and the common electrode panel 200.

With reference to FIGS. 1, 2 and 4, the exemplary TFT array panel 100 includes a blocking film 111 made of silicon oxide (SiOx) or silicon nitride (SiNx) formed on an insulating substrate 110, which is made of transparent glass or plastic. The blocking film 111 may have a multi-layered structure.

A plurality of semiconductor islands 151 made of polysilicon are formed on the blocking film 111. Each semiconductor island 151 includes a first horizontal unit 151*a* extending in a horizontal direction, a vertical unit 151*b* extending in a vertical direction from the first horizontal unit 151*a*, and a second horizontal unit 151*c* connected to the vertical unit 151*b* and extending in a horizontal direction. The first horizontal unit 151*a* and the second horizontal unit 151*c* may each have a wide end for making connection with another layer.

Each of the semiconductor islands 151 includes an extrinsic region having a conductive impurity and an intrinsic region having little, if any, conductive impurity. The extrinsic region includes a heavily doped region having a high impurity concentration and a lightly doped region having a low impurity concentration.

The intrinsic region includes two channel regions 154*a* and 154*b* that are physically separated from each other. Each of the channel regions 154*a* and 154*b* is located at the vertical unit 151*b* and the second horizontal unit 151*c* of the semiconductor island 151, respectively. The high concentration extrinsic regions includes a source region 153, a source/drain region 159, and a drain region 155, which are divided into sectors by the channel regions 154*a* and 154*b*.

The lightly doped extrinsic regions 152*a* and 152*b* are formed between the heavily doped regions 153, 155, and 159, and the channel regions 154*a* and 154*b* comprise lightly doped drain (LDD) regions and have narrower widths as compared to the other regions.

The conductive impurity may be a P-type impurity, including boron (B) or gallium (Ga), or an N-type impurity, including phosphor (P) or arsenic (As). The lightly doped regions 152*a* and 152*b* prevent the occurrence of a leakage current and punch-through of the thin film transistor, and in an alternative embodiment, an offset region having no impurity can be substituted for the lightly doped regions 152*a* and 152*b*.

A gate insulating layer 140 made of silicon nitride or silicon oxide is formed on the semiconductor islands 151 and the blocking film 111, and a plurality of gate lines 121 and a plurality of storage electrode lines 131 extending generally in a horizontal direction are formed on the gate insulating layer 140. The gate lines 121 respectively transfer gate signals and include a plurality of respective gate electrodes 124 that protrude upwardly in, e.g., FIG. 2.

A predetermined portion of each gate line 121 overlaps the channel region 154*a* in the vertical unit 151*b* of the semiconductor island 151, and the gate electrode 124 overlaps the channel region 154*b* formed in the second horizontal unit 151*c* of the semiconductor island 151. The predetermined portion of each gate line 121 that overlaps the channel region 154*a* formed in the vertical unit 151*b* functions as a gate electrode of an associated thin film transistor.

Each of the gate lines 121 may have a wide end that is used for connection with another layer or an external driving circuit. Where a gate driving circuit (not illustrated) for generating a gate signal is integrated on the substrate 110, the gate line 121 may connect directly to the gate driving circuit.

Each of the storage electrode lines 131 receives a predetermined voltage, and includes widened storage electrodes 133 having portions that protrude upwardly and downwardly, as illustrated in FIGS. 1 and 2. Each storage electrode line 131 is separated from the adjacent gate lines 121 by the same respective distances.

The gate lines 121 and the storage electrode lines 131 may be made of an aluminum group metal, including aluminum (Al) and an aluminum alloy, a silver group metal, including silver (Ag) and a silver alloy, a copper group metal, including copper (Cu) and a copper alloy, a molybdenum group metal, including molybdenum (Mo) and a molybdenum alloy, chromium (Cr), tantalum (Ta), or titanium (Ti). The gate lines 121 and the storage electrode lines 131 may have a multilayered structure having two conductive layers (not illustrated), each having different physical properties than the other. For example, one of the conductive layers may be made of a metal having a low resistivity, for example, an aluminum group metal, a silver group metal, or a copper group metal, in order to reduce signal delay or voltage drop. The other layer may be made of a different material, and in particular, one having excellent physical, chemical, and electrical contact characteristics in conjunction with indium tin oxide (ITO) and indium zinc oxide (IZO), such as a molybdenum group metal, chromium, tantalum, and titanium. In some exemplary embodiments thereof, the gate lines 121 and the storage electrode lines 131 may be formed of a chromium lower layer and an aluminum (alloy) upper layer, or an aluminum (alloy) lower layer and a molybdenum (alloy) upper layer. In addition or alternative to the described multi-layered structures, the gate lines 121 and the storage electrode lines 131 may be formed of various other metals or conductors.

The sides of the gate lines 121 and the storage electrode lines 131 may be inclined relative to the substrate 110, and preferably, at an angle of about 30° to about 80°.

An interlayer insulating layer 160 is formed on the gate lines 121, the storage electrode lines 131, and the gate insulating layer 140. The interlayer insulating layer 160 may comprise an organic material having a superior planarization characteristic and photosensitivity, a low dielectric insulating material, such as a-Si:C:O and a-Si:O:F, which is formed through plasma chemical vapor deposition, or an inorganic material, such as silicon nitride. A plurality of contact holes 63 and 65 are formed in the interlayer insulating layer 160 and the gate insulating layer 140 to respectively expose the source regions 153 and the drain regions 155.

A plurality of data lines 171 and a plurality of drain electrodes 175 are formed on the interlayer insulating layer 160 in a direction so as to cross the gate lines 121 and the storage electrode lines 131. Each of the data lines 171 includes a plurality of first and second vertical units 171a and 171b that extend in a vertical direction in FIGS. 1 and 2, and a connector 171c connecting the first vertical unit 171a and the second vertical unit 171b.

Each of the first vertical units 171a and the second vertical units 171b are disposed at regular intervals in the vertical direction. The first vertical unit 171a and the second vertical unit 171b are formed so as to repeat alternately. Therefore, each data line 171 includes a plurality of repetitively alternating bends, as illustrated in FIGS. 1 and 2. That is, the first vertical unit 171a, the second vertical unit 171b and the connector 171c are disposed in a repeating pattern that includes the first vertical unit 171a, the connector 171c extending from the first vertical unit 171a in a horizontal direction, the second vertical unit 171b connected to the connector 171c in a vertical direction, a connector 171b extending from the second horizontal unit 171b in a horizontal direction, and the first vertical unit 171a connected to the connector 171c in a vertical direction.

Each of the data lines 171 is connected to associated ones of the source regions 152 through associated ones of the contact holes 63, and the connecting portions of the data line 171 has a width that is wider than the other portions thereof so as to define a source electrode 173 of associated ones of the thin film transistors. Each of the data lines 171 has an end with a increased area that enables it to be connected to another layer or to an external driving circuit. Where a data driving circuit (not illustrated) for generating a data signal is integrated on the substrate 110, the data lines 171 may be connected directly to the data driving circuit.

Each drain electrode 175 is separated from the associated data line 171, and one end of the drain electrode is connected to the associated drain region 155 through the associated contact hole 65. The drain electrode 175 extends along the first and second vertical units 171a and 171b of the data line 171 to the opposite end thereof, which is not connected to the drain region 155, thereby overlapping the storage electrode 133.

The data lines 171 and the drain electrodes 175 are preferably made of a refractory metal, such as molybdenum, chromium, tantalum, or titanium, or an alloy of a respective one thereof. Also, as described above, the data lines 171 and the drain electrodes 175 may have a multi-layered structure, including a refractory metal layer (not illustrated) and a low resistivity conductive layer (not illustrated). For example, the data lines 171 and the drain electrodes 175 may have a dual-layered structure of a chromium or molybdenum (or an alloy thereof) lower layer and an aluminum (or an alloy thereof) upper layer, or even a triple-layered structure of, for example, a molybdenum or molybdenum alloy lower layer, an aluminum or aluminum alloy intermediate layer, and a molybdenum or molybdenum alloy upper layer. In addition to the above-described multi-layered structures, the data lines 171 and the drain electrodes 175 may be formed of various other metals or conductors. As described above, the sides of the data lines 171 and the drain electrodes 175 are preferably inclined from the substrate 110 at an angle of from about 30° to about 80°.

A passivation layer 180 made of an organic material having an excellent planarization characteristic is formed on the data lines 171, the drain electrodes 175, and the interlayer insulating layer 160. The passivation layer 180 can be formed through a photo process using a material having photosensitivity. The passivation layer 180 may be made of, for example, a low dielectric insulating material having a dielectric constant less than about 4.0, which is formed through plasma enhanced chemical vapor deposition (PECVD), such as a-Si:C:O and a-Si:O:F, or of an inorganic material, such as silicon nitride. Also, the passivation layer 180 may include a lower layer made of an inorganic material and an upper layer made of an organic material.

The passivation layer 180 includes a plurality of contact holes 185 through which respective ones of the drain electrodes 175 are exposed.

A plurality of pixel electrodes 191, which are made of a transparent conductive material, such as IZO or ITO, or alternatively, an opaque reflective conductive material, such as aluminum or silver, are formed on the passivation layer 180. Each of the pixel electrodes 191 includes the first sub-electrode 9a and the second sub-electrode 9b. The first sub-electrode 9a and the second sub-electrode 9b both preferably have a quadrangular shape with rounded corners, as illustrated in FIGS. 1 and 2, and the first sub-electrode 9a and the second sub-electrode 9b are both connected to an associated connecting member 85.

The left and right boundaries of each pixel electrode 191 are located above the first and second vertical units 171a and 171b of the adjacent data lines 171. The left and right boundaries of the pixel electrode 191 located in any given pixel low are thus located around a virtual vertical centerline of an adjacent pixel electrode 191 located in either the next or the previous pixel low. The vertical centerlines of two adjacent pixel electrodes 191 are not located the same straight line that is, the vertical center lines of adjacent two pixel electrodes 191 are different by the distance from the left or right boundary lines thereof to the center of the connecting member 85.

As indicated by the dashed line regions T in FIG. 1, three adjacent pixel electrodes form a triple-pixel region T, with two corners of two laterally adjacent pixel electrodes and one edge of a vertically adjacent pixel electrode being disposed in approximately a triangular shape, and an associated thin film transistor, comprising an associated gate electrode 124, source electrode 173, drain electrode 175, and semiconductor island 151, is located in each of the triple-pixel regions T. In this particular exemplary embodiment, each semiconductor island 151 extends through two adjacent triple-pixel regions T. As those of skill in the art will appreciate, by using the semiconductor island 151 thus, the space needed for connecting the source region 153 and the source electrode 173 through the contact hole 63, and for connecting the drain region 155 and the drain electrode 175 through the contact hole 65, can be obtained without influencing the aperture ratio of the display. The gate line 121 and the gate electrode 124 overlap one another as a result of forming the semiconductor island 151 vertically, thereby forming a "dual gate" thin film transistor having an increased channel length.

Each connecting member 85 includes a vertical element for connecting the associated first and second sub-electrodes 9a and 9b, and a protrusion for making connection with other layers. The protrusion is electrically and physically connected to the drain electrode 175 through the contact hole 185. The protrusion thus receives a data voltage from the drain electrode 175 and transfers the data voltage to the pixel electrode 191.

The pixel electrode 191 receiving the data voltage generates an electric field in combination with a common electrode 270 of the common electrode panel 200, which receives a common voltage, thereby determining the orientation of the molecules of the liquid crystal layer 3 disposed between the two electrodes 191 and 270. The direction in which the liquid crystal molecules are oriented determines the polarization, and hence, the amount of light passing through the liquid crystal layer 3. Additionally, each pixel electrode 191 and the common electrode 270 form a capacitor (a liquid crystal capacitor) that functions to sustain the voltage applied to the pixel electrode after the thin film transistor is turned off.

The pixel electrode 191 is electrically connected to the drain electrode 175. A capacitor formed by the overlap of the drain electrode 175 with the storage electrode 133 forms another storage capacitor that enhances the voltage-sustaining power of the liquid crystal capacitor.

The common electrode panel 200 of the exemplary LCD is described below with reference to FIGS. 1, 3 and 4.

A light blocking member 220 made of transparent glass or plastic is formed on an insulating substrate 210. The light blocking member 220 is a black matrix, and prevents light leakage of the pixel electrodes 191. The light blocking member 220 faces the pixel electrodes 191 and includes a plurality of openings 225, each having a shape almost identical to that of a corresponding one of the pixel electrodes 191. The width of the light blocking member 220 is increased in regions corresponding to the regions of the triple pixel regions T so as to completely cover them.

A plurality of color filters 230 are formed on the substrate 210. The color filters 230 are formed in regions that are surrounded by the light blocking member 220. Each of the color filters 230 can display a respective primary color, such as red (R), green (G), and blue (B).

As illustrated in FIG. 1, the red (R), green (G), and blue (B) color filters 230 are alternately repeated in the horizontal direction such that each of the three pixel electrodes 191 forming each triple pixel region displays a respective one of red (R), green (G), and blue (B).

An overcoat 250 may optionally be formed on the color filters 230. The overcoat 250 may be made of an organic insulating material, and provides a planarization side to prevent the color filters 230 from being exposed. In some embodiments, the overcoat 250 may be omitted.

A common electrode 270 is formed on the overcoat 250. The common electrode 270 may be made of a transparent conductor, such as ITO and IZO. A plurality of cutouts 27 are formed on the common electrode 270. Each of the cutouts 27 may have a circular or quadrangular shape with rounded corners, and is formed to correspond to the center portion of a corresponding one of the sub-electrodes 9a and 9b.

Alignment layers 11 and 21 are coated on an inside surface of the display panels 100 and 200. In the particular exemplary embodiments described herein, the alignment layers 11 and 21 are vertical alignment layers. Polarizers 12 and 22 are formed on the external surface of the display panels 100 and 200, and the polarization axes of the two polarizers 12 and 22 cross one another orthogonally. In the case of a reflective liquid crystal display, one of the two polarizers 12 and 22 can be omitted.

The exemplary LCD may further include a phase retardation film (not illustrated) for compensating the delay of the liquid crystal layer 3, as well as a backlight unit (not illustrated) for supplying light to the polarizers 12 and 22, the phase retardation film, the display panels 100 and 200, and the liquid crystal layer 3.

The liquid crystal layer 3 has negative dielectric anisotropy, and as illustrated in FIG. 4, the longitudinal axes of the molecules 31 of the liquid crystal layer 3 are aligned almost vertically to the respective surfaces of the two display panels 100 and 200 when no electric field is being generated between the respective electrodes thereof. Therefore, light cannot pass through the polarizers 21 and 22, which cross one another. That is, the polarizers 21 and 22 block passage of the light through the display panel.

However, when a common voltage is applied to the common electrode 270 and a data voltage is applied to a pixel electrode 191, an electric field is induced between the electrodes that is vertical to the surfaces of the display panels 100 and 200, and in response thereto, the orientations of the liquid crystal molecules change such that their longitudinal axes are more vertical relative to the direction of the electric field.

The cutouts 27 of the field generating electrodes 191 and 270 and the sides of the pixel electrodes 191 function to distort the electric field locally so as to create a horizontal component that determines the direction of inclination of the liquid crystal molecules 31 locally. The horizontal component of the electric field is disposed almost vertically to the sides of the cutout 27 and the pixel electrode 191. Since the liquid crystal molecules are locally inclined by the electric field induced by the four sides of the first and second sub-electrode 9a and 9b and the cutouts 27, the molecules are inclined omnidirectionally within the pixels. As described above, the liquid crystal molecules 31 are aligned in various directions, and the reference viewing angle of the liquid crystal display is thereby made larger.

In the exemplary LCD embodiments described herein, the semiconductor comprises polysilicon or amorphous silicon.

Figure 5:
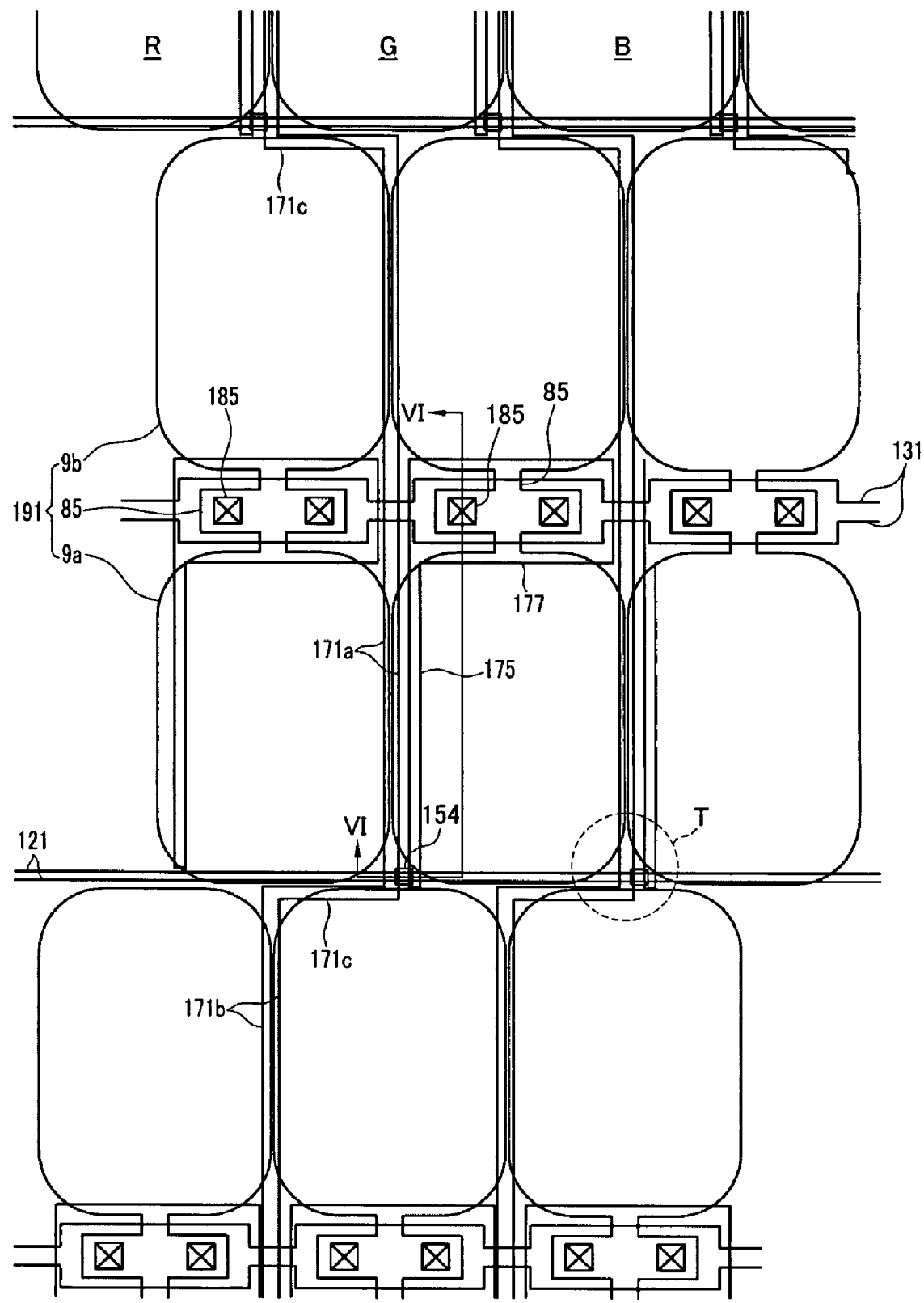
FIG. 5 is a partial plan view of another exemplary embodiment of a TFT array panel in accordance with the present invention; and, FIG. 6 is a partial cross-sectional view of the TFT array panel of FIG. 5, as seen along the lines of the section VI-VI taken therein.
Figure 6:
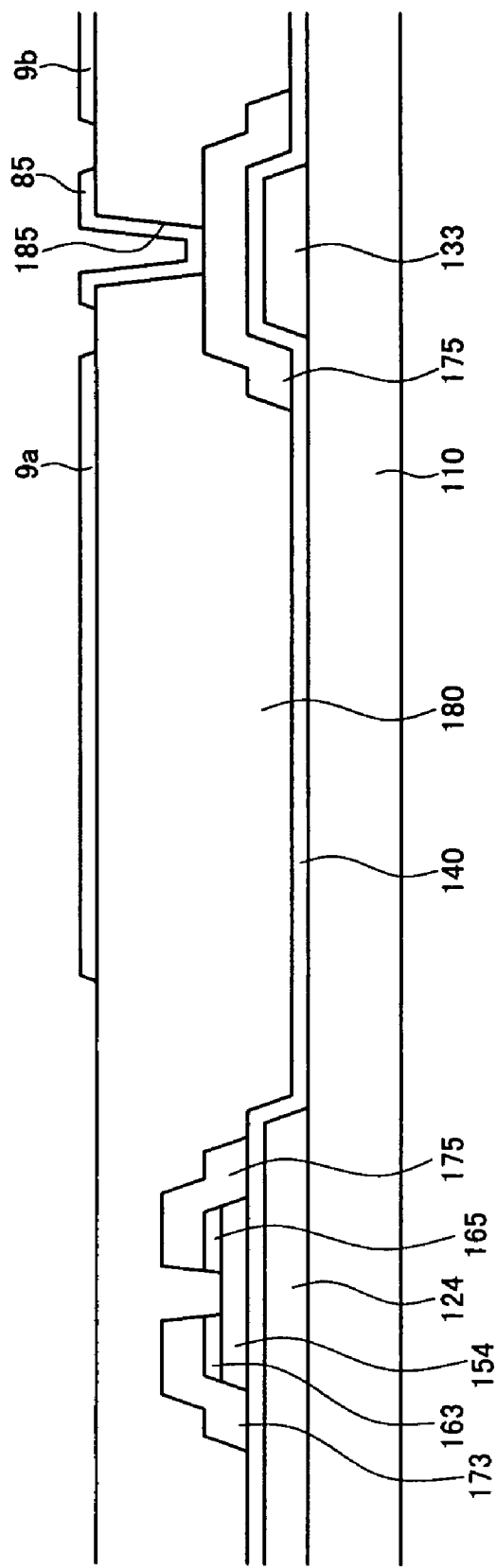

Another exemplary embodiment of a thin film transistor array panel in accordance with the present invention is described with reference to FIG. 5 and FIG. 6, wherein FIG. 5 is a partial plan view of the exemplary TFT array panel, and FIG. 6 is a partial cross-sectional view of the panel as seen along the lines of the section VI-VI taken therein.

In the second exemplary array panel, a plurality of gate lines 121 and storage electrode lines 131 are formed on a transparent glass or plastic insulating substrate. The gate lines 121 transfer gate signals and extend in a horizontal direction in FIG. 5. Each of the gate lines 121 has a wide end adapted for connection with another layer or an external driving circuit. A gate driving circuit (not illustrated) that generates the gate signals may be formed on a flexible printed circuit film (not illustrated) that mounts on the substrate 110, or may be mounted directly on the substrate or otherwise integrated on the substrate 110. Where a gate driving circuit is integrated on the substrate 110, the gate lines 121 may extend and be directly connected to the gate driving circuit.

The storage electrode lines 131 receive a predetermined voltage, and extend generally parallel with the gate lines 121. The storage electrode line 131 includes widened storage electrodes 133 that extend upwardly and downwardly.

As illustrated in FIGS. 5 and 6, the gate lines 121 and the storage electrode lines 131 may be formed of the same material as those in the exemplary embodiment of FIGS. 1 and 2.

Additionally, the sides of the gate lines 121 and the storage electrode lines 131 may be inclined relative to the surface of the substrate 110, preferably at an angle of from about 30° to about 80°.

A gate insulating layer 140 made of silicon nitride (SiNx) or silicon oxide (SiOx) is formed on the gate lines 121 and the storage electrode lines 131.

A plurality of semiconductor islands 154 made of hydrogenated amorphous silicon (a-Si) are formed on the gate insulating layer 140. Each of the semiconductor islands 154 has a predetermined portion that overlaps the gate line 121, and the overlap of the semiconductor island 154 with the gate line 121 forms the gate electrode 124 of the associated thin film transistor. Ohmic contact islands 163 and 165 are formed on the semiconductor 154. The ohmic contacts 163 and 165 can be made of n+ hydrogenated amorphous silicon material in which an n-type impurity, such as phosphor, is doped at a high concentration, or alternatively, of silicide. The ohmic contact islands 163 and 165 form associated pairs and are disposed on respective ones of the semiconductors 154.

The sides of the semiconductors 154 and the ohmic contacts 163 and 165 may also be inclined from the substrate 110 at an inclination angle of about 30° to about 80°.

A plurality of data lines 171 and a plurality of drain electrodes 175 are formed on respective ones of the ohmic contacts 163 and 165 and the gate insulating layer 140. Each data line 171 transfers a respective data signal and extends in a generally vertical direction in FIG. 5, thereby crossing the gate lines 121 and the storage electrode lines 131.

As in the exemplary embodiment of FIG. 1 above, each data line 171 includes a plurality of repetitive bends, first vertical units 171a, second vertical units 171b and connectors 171c. Pre-determined portions of the first vertical units 171a and the second vertical unit 171b overlap the associated semiconductor 154, and the overlapping portions function as the source electrodes 173 of the respective thin film transistors.

The end of each data line 171 has a widened area for connection with another layer or an external driving circuit. A data driving circuit (not illustrated) for generating data signals may be formed on a flexible printed circuit film (not illustrated) that mounts on the substrate 110, or may mount directly on the substrate 110, or otherwise be integrated on the substrate 110. Where a data driving circuit is integrated on the substrate 110, the data lines 171 may extend and be directly connected to the data driving circuit.

Each drain electrode 175 is separated from the associated data line 171, and one end of the drain electrode 175 faces the associated source electrode 173 with the associated gate electrode 124 centered therebetween. The long axis of the drain electrode 175 extends along the first and second vertical units 171a and 171b of the data line 171, and the other end not facing the source electrode 173 extends so as to overlap the storage electrode 133.

One gate electrode 124, one source electrode 173, and one drain electrode 175, together with the semiconductor 154 therebetween, form a single thin film transistor (TFT), and the channel of the thin film transistor is formed in the semiconductor 154 between the source electrode 173 and the drain electrode 175 thereof.

The data lines 171 and the drain electrodes 175 may be formed of the same material as the data lines 171 and drain electrodes 175 shown in FIG. 1 and FIG. 2. Preferably, the sides of the data lines 171 and the drain electrodes 175 are inclined at an angle of about 30° to about 80° from the substrate 110.

The ohmic contacts 163 and 165 are present on the semiconductor 154 only between the semiconductor and respective ones of the data lines 171 and the drain electrodes 175, and function to reduce the respective contact resistances therebetween.

The semiconductor 154 includes exposed portions, i.e., portions not covered by the data line 171 and the drain electrode 175, for example, those located between the source electrode 173 and the drain electrode 175.

A passivation layer 180 is formed on the data line 171, the drain electrode 175, and the exposed portions of the semiconductor 154.

The passivation layer 180 may comprise either an inorganic insulator or an organic insulator, and has a flat upper surface. The inorganic insulator may be silicon nitride or silicon oxide. The organic insulator may be photosensitive, and preferably, has a dielectric constant less than about 4.0. Additionally, the passivation layer 180, may have a dual-layered structure formed of a lower inorganic layer and an upper organic layer in order to both sustain the excellent insulating characteristic of the organic layer and to prevent the organic layer from harming the exposed portions of the semiconductors 154.

The passivation layer 180 includes a plurality of contact holes 185 to respectively expose the drain electrodes 175.

A plurality of pixel electrodes 191 made of IZO or ITO are formed on the passivation layer 180.

As above, each of the pixel electrodes 191 includes a first sub-electrode 9a and a second sub-electrode 9b, and the first sub-electrodes 9a and 9b each has a shape of a quadrangle with rounded corners. The first sub-electrode 9a and the second sub-electrode 9b are connected to one another through the connecting member 85.

The left and right boundaries of the pixel electrodes 191 are located above the data lines 171. The left and right boundaries of the pixel electrodes 191 located in a given pixel are thus located around a virtual vertical centerline of an adjacent pixel electrode 191 in either the next or the previous pixel low. The vertical centerlines of two adjacent pixel electrodes 191 are not located the same straight line. That is, the vertical centerline of adjacent two pixel electrodes 191 are different by the distance from the left or right boundary lines to the center of the connecting member 85.

As illustrated in FIG. 5, three adjacent pixel electrodes form a triple pixel region (T) having an approximately triangular shape defined by corners of two laterally adjacent pixel electrodes and an edge of a vertically adjacent pixel electrode. An associated thin film transistor, formed of an adjacent gate electrode 124, a source electrode 173, a drain electrode 175, and a semiconductor 154, is located in each triple pixel region (T).

The connecting member 85 includes a vertical unit connected to the first sub-electrode 9a and the second sub-electrode 9b, and a protrusion for making connection with another layer. The protrusion is physically and electrically connected to an extending unit 177 through the contact hole 185. The protrusion receives a data voltage from the drain electrode 175 and transfers the received data voltage to the associated pixel electrode 191.

As described above, a thin film transistor is disposed in each of the triple pixel regions, thereby minimizing the regions of overlap of the thin film transistors and the pixel electrodes. As a result, the aperture ratio of each pixel electrode is increased, thereby enabling an LCD having both a relatively wide viewing angle and a relatively high luminance to be provided.

As those of skill in this art will by now appreciate, many modifications, substitutions and variations can be made in and to the materials, methods and configurations of the high-brightness LCDs of the present invention without departing from the spirit and scope of the invention. In light of this, the scope of the present invention should not be limited to that of the particular embodiments illustrated and described herein, as they are only by way of examples thereof, but instead, should be fully commensurate with that of the claims appended hereafter and their functional equivalents.

What is claimed is:

1. A liquid crystal display, comprising:
an insulating substrate;
a semiconductor disposed on the insulating substrate, including a source region, a drain region, and a channel region;
a gate insulating layer disposed on the semiconductor;
a gate line disposed on the gate insulating layer and overlapping the channel region;
an interlayer insulating layer disposed on the gate line;
a data line disposed on the interlayer insulating layer and having a source electrode electrically connected to the source region;
a drain electrode electrically connected to the drain region;
a passivation layer disposed on the data line and drain electrode; and,
a pixel electrode disposed on the passivation layer and electrically connected to the drain electrode, and
wherein the data line overlaps the source region in a first direction parallel with the gate line,
wherein the drain region extends in the first direction and the data line extends in a second direction different from the first direction, and
wherein the data line overlaps the drain region in a region in which the data line and the drain region intersect.

2. The liquid crystal display of claim 1, wherein the source electrode overlaps the source region.

3. The liquid crystal display of claim 1, wherein
the gate line includes a gate electrode protruding from the gate line, and
the channel region includes a first channel region overlapping the gate line and a second channel region overlapping the gate electrode.

4. The liquid crystal display of claim 3, wherein the semiconductor includes one or more bends.

5. The liquid crystal display of claim 1, wherein the semiconductor comprises polysilicon.

6. The liquid crystal display of claim 1, wherein the pixel electrode comprises a plurality of sub-electrodes, each having a quadrangular shape with rounded corners.

7. The liquid crystal display of claim 6, wherein:
a plurality of the pixel electrodes is formed on the substrate;
the pixel electrodes are aligned in a matrix;
each of the pixel electrodes is disposed between two pixel electrodes of an adjacent pixel row so that three adjacent pixel electrodes form a triple pixel region; and,
the semiconductor extends through two adjacent triple pixel regions.

8. The liquid crystal display of claim 7, wherein:
the source electrode and the drain electrode are respectively connected to the source region and the drain region through first and second contact holes formed in the interlayer insulating layer, and
the first and second contact holes are disposed in an associated one of the triple pixel regions.

9. The liquid crystal display of claim 7, wherein each of the triple pixel regions is defined by corners of two laterally adjacent pixel electrodes and one edge of a vertically adjacent pixel electrode.

10. The liquid crystal display of claim 7, further comprising:
a second substrate disposed in facing opposition to the insulating substrate;
a light blocking member formed on the second substrate;
a color filter formed in a region defined by the light blocking member; and,
a common electrode having a plurality of cutouts formed on the color filter.

11. The liquid crystal display of claim 10, wherein the light blocking member comprises portions respectively corresponding to each of the triple pixel regions.

12. The liquid crystal display of claim 10, wherein each cutout is disposed over the center of a corresponding one of the sub-electrodes.

13. The liquid crystal display of claim 10, wherein color filters corresponding to each of the three pixel electrodes of each triple pixel region displays a respective one of red, green, and blue colors.

14. The liquid display of claim 1, wherein the data line comprises a plurality of repetitively alternating bends.

15. The liquid display of claim 1, wherein the data line comprises a plurality of first and second units extending in a second direction, and a connector connecting the first unit and the second unit.

16. The liquid display of claim 15, wherein the connector overlaps the source region.

* * * * *